United States Patent [19]
Kolbe et al.

[11] 3,939,523
[45] Feb. 24, 1976

[54] HEADLAMP WASHER AND WIPER SYSTEM

[75] Inventors: William H. Kolbe, Birmingham; Donald C. Unger, Grosse Pointe Park, both of Mich.

[73] Assignee: General Motors Corporation, Detroit, Mich.

[22] Filed: Oct. 16, 1974

[21] Appl. No.: 515,184

[52] U.S. Cl. ........ 15/250.02; 15/250 A; 15/250.04; 15/250.3
[51] Int. Cl.² ............................................. B60S 1/48
[58] Field of Search .......... 15/250.01–250.04, 250.3, 250 A

[56] References Cited
UNITED STATES PATENTS

| | | | |
|---|---|---|---|
| 3,058,142 | 10/1962 | Pollock | 15/250 A |
| 3,593,015 | 10/1971 | Marchant | 15/250 A |
| 3,641,613 | 2/1972 | Povilaitis et al. | 15/250 A |
| 3,686,704 | 8/1972 | Sharpe et al. | 15/250 A |
| 3,719,819 | 3/1973 | Lowell | 15/250.02 |

FOREIGN PATENTS OR APPLICATIONS

| | | | |
|---|---|---|---|
| 1,187,867 | 4/1970 | United Kingdom | 15/250.04 |

*Primary Examiner*—Peter Feldman
*Attorney, Agent, or Firm*—Peter D. Sachtjen

[57] ABSTRACT

A headlamp washer and wiper system wherein washer fluid is delivered from a windshield washer pump to a washer and wiper holder located for bidirectional pivotal movement across the headlamp lens as actuated by a vacuum motor and controlled by an operator controlled program switch. During a downward stroke across the headlamp lens, the holder nozzles distribute water thereon for dissolving and loosening accumulated particulate and in an upward stroke the holder wiper blade wipes the lens free of the particulate.

3 Claims, 3 Drawing Figures

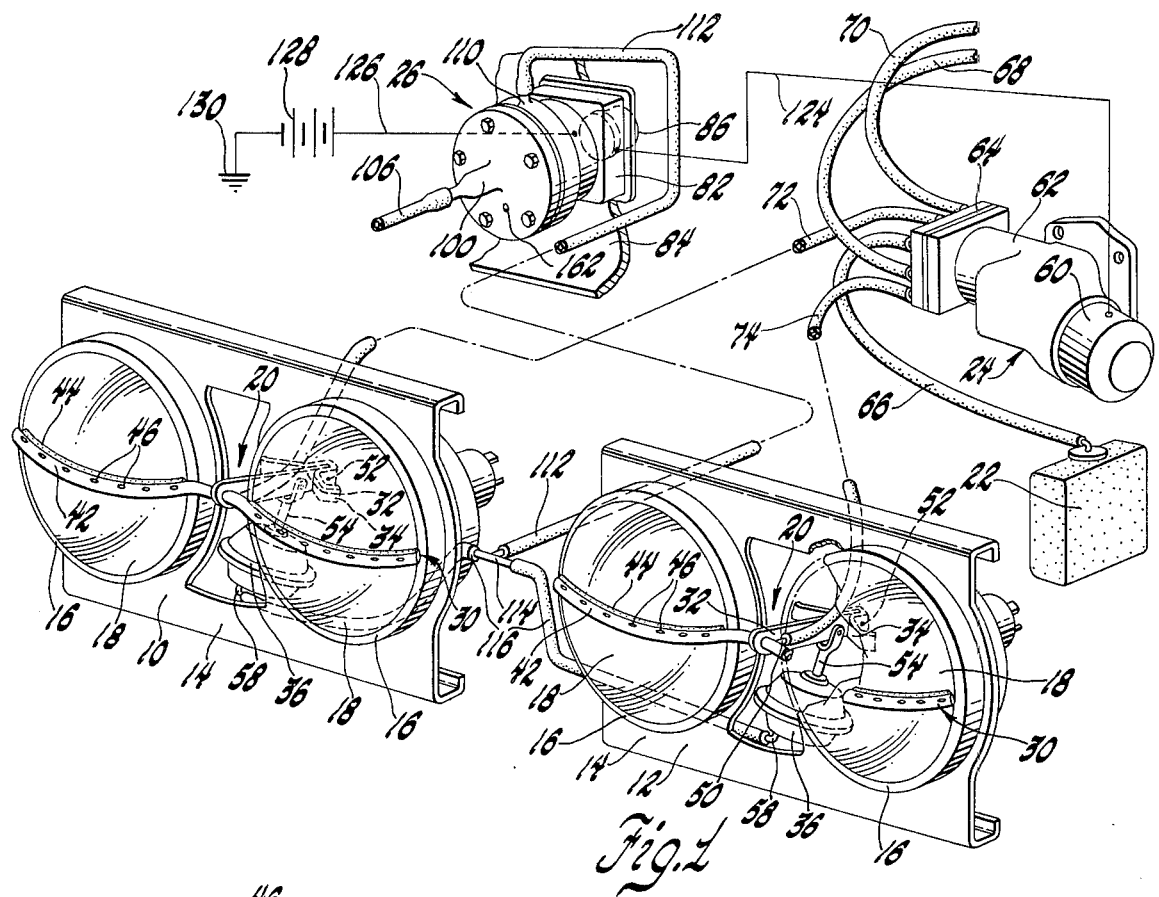
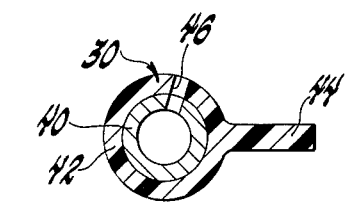
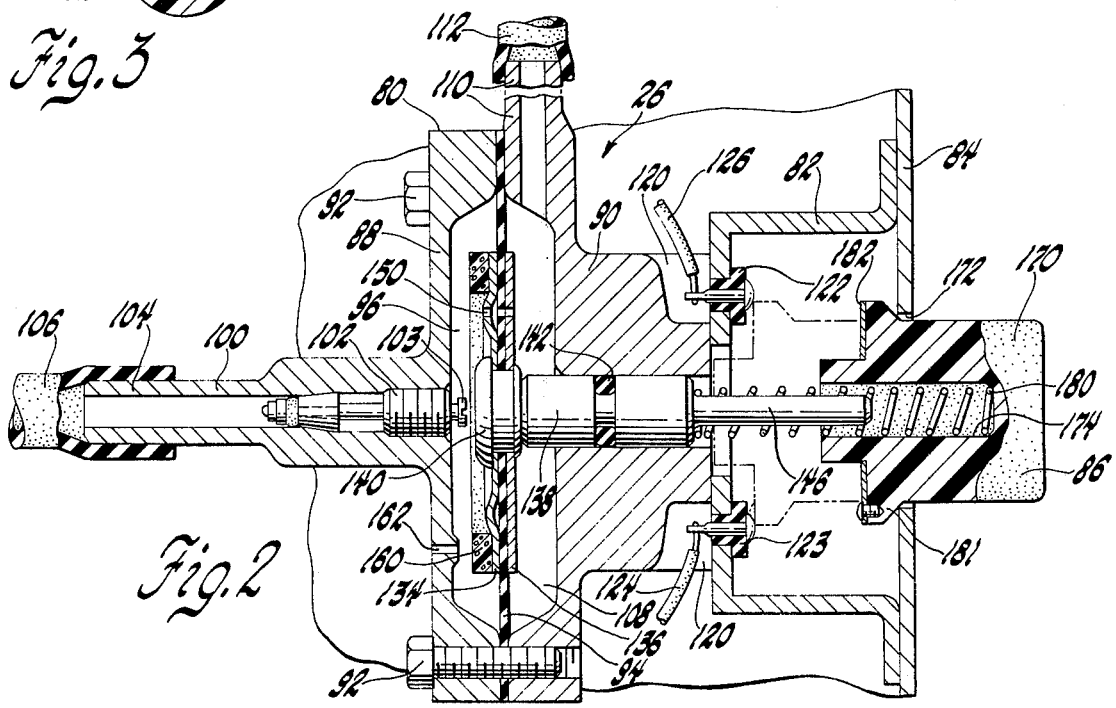
Fig. 2

HEADLAMP WASHER AND WIPER SYSTEM

The present invention relates to a cleaner for motor vehicle headlamps and, in particular, to a headlamp washer and wiper system wherein particulate matter on the headlamp lens is dissolved by the washer solvent during one part of a cycle and wiped therefrom by a wiper blade during a second part of the cycle each time an operator controlled switch is actuated.

More particularly, a combination nozzle and wiper holder assembly is pivotally mounted on a mechanism for verhical arcuate movement with respect to the spherical headlamp lens about a horizontal axis. The axis for the mechanism approximately intersects the origin for the lens surface such that the movement conforms to the curvature in the vertical plane. The holder assembly has a curvature approximating the curvature of the lens in a horizontal plane. The mechanism is pivoted across the face of the lens by means of a vacuum motor. The vacuum motor is actuated by an operator controlled program switch which applies vacuum to the motor when the button is depressed. This pivots the holder vertically downwardly from an upper park position across the lens to a depressed position and, after release, the motor is vented to atmosphere and spring returned upwardly across the lens to the parked position. Actuation of the program switch also energizes a conventional washer pump which is fluidly connected to the holder nozzles. When the switch is actuated the washer pump delivers solvent from a reservoir to the nozzles for spraying on the lens during downward travel thereacross. As the mechanism returns upwardly, the holder wiper blade removes the dissolved particulate. The mechanism automatically comes to rest at the upper park position which spaced from the headlamps such that the latter be replaced or serviced without disrupting the washer system. The system also uses a conventional washer pump and reservoir thus enabling the system to be incorporated into current vehicles merely by adding the program switch, and increasing the outlets at the pump valve assembly.

The above and other features of the present invention will be apparent to one skilled in the art upon reading the following detailed description, reference being made to the accompanying drawings illustrating a preferred embodiment of the present invention in which:

FIG. 1 is a schematic view of a motor vehicle incorporating the subject headlamp washer and wiper system;

FIG. 2 is a side cross-sectional view of the program switch for controlling operation of the washer and wiper system shown in FIG. 1, and FIG. 3 is an enlarged cross-sectional view of the nozzle and wiper holder.

Referring to FIG. 4, a four headlamp system for a motor vehicle includes headlamp assemblies 10 and 12. Each headlamp assembly comprises a housing 14 on which there are adjustably mounted a pair of sealed beam headlamp units 16 having spherical front lenses 18. The units 16 are conventionally electrically connected to a vehicle electrical system.

Each headlamp assembly 10 and 12 includes a washer and wiper assembly 20 which distributes solvent from a reservoir 22 as delivered by a pump assembly 24 controlled by a program switch 26. As hereinafter explained, a single cycle of the assembly 20 will distribute solvent from the reservoir 22 onto the lens 18 for a first portion of the cycle and will wipe dissolved accumulations of road dirt and grime during a second portion of the cycle. The cycle is initiated by operator actuation of the switch 26.

More particularly, each washer and wiper assembly 20 includes a washer and wiper holder 30 carried by a mechanism including a lever arm 32 pivotally supported on a bracket 34 secured to the housing 14 and controlled by a vacuum motor 36. Each holder 30 comprises a metallic solvent distributor tube 40, an elastomeric wiper element 42 surrounding and bonded the tube 40 and a wiper blade 44 integral with the element 42 (FIG. 3). The holder 30 is longitudinally centrally connected to the lever arm 32 and includes outboard curved sections having a radius substantially conforming the curvature of the headlamp lens 18 in a horizontal plane through its geometric center. The blade 44 has sufficient flexibility to maintain substantial contact with the lens 18 throughout its cyclic motion. The holder 30 is provided with a plurality of dispensing orifices 46 along its upper edges. The orifices 46 are inclined with respect to the blade 44 so as to distribute solvent onto the lens 18 trailing the downward movement of the mechanism 20 during the first portion of the washing cycle. The holder 30 is also provided with a T-connection 50 at its midpoint for connection with the pump assembly 24.

The lever arm 32 is connected at a horizontal pivotal axis 52 rearwardly of the housing 14. The length of the arm 32 with respect to the axis 52 establishes a pivot point thereabout which moves the holder 30 in an arc having a radius equal to the spherical radius of the lens 18. By virtue of the curvature of the holder 30 and the pivotal radius of the arm 32, the blades 44 maintains substantial contact with the lens 18 throughout the pivotal movement of the washing and wiping cycle.

The vacuum motor 36 is a conventional diaphragm-type construction having an internal spring. The motor 36 has an actuating piston 54 connected to the lever arm 32 adjacent the pivot axis 52. The motor 36 has a vacuum connection 58 on its lower surface. Vacuum is applied to the lower chamber of the motor 36 through the connection 58. The diaphragm is connected to the piston 54 to move downwardly due to the applied pressure differential from a parked position wherein the holder 30 is located completely above the head units 16 to a depressed position at the bottom portions or below the headlamp lens 18, the holders being illustrated at mid-position. As the pressure differential in the motor 36 is reduced by action of the switch assembly 26 as hereinafter explained, the internal spring biases the piston 54 and thereby the arm 32 and the holder 30 upwardly to the aforementioned parked position.

The washer pump assembly 24 is a conventional construction having a motor 60, a pump mechanism 62 and a valve assembly 64. The valve assembly 64 has an inlet connected via conduit 66 to the reservoir 22 and two outlets leading to the windshield washers (not shown) via conduits 68 and 70. The valve assembly 64 is modified herein to provide two additional outlets connected to conduits 72 and 74. The conduit 72, 74 are fluidly connected to the T-connection 50 at the mechanisms 20. With the exceptions of these modifications, the washer may be any commercially available unit.

When the motor 60 is energized pump mechanism 62 draws water from the reservoir 22 through conduit 66 and thereafter distributes the solvent through valve assembly 64 and the various outlet conduits in a programmed series of pulses or squirts.

The switch assembly 26 as shown in FIG. 2 comprises a housing 80 mounted on a bracket 82 connected to the vehicle instrument panel 84 and actuated by pushbutton 86. The housing 80 comprises a front section 88 connected to a base section 90 by means of fasteners 92 and clamping therebetween a diaphragm 94. The front section 88 includes a disk-shaped surface defining with the diaphragm 94 a first vacuum chamber 96. The front section 88 is provided with an outlet tube 100 in which there is positioned a valve assembly 102. The valve assembly 102 is the tire valve construction which permits the passage of air when the head 103 is depressed. The outlet tube 100 has a tip 104 to which a vacuum conduit 106 is connected. The conduit 106 leads to a source of vacuum such as the engine intake manifold (not shown). The base section 90 has a disk-shaped surface defining with diaphragm 94 a second vacuum chamber 108. A radially extending outlet tube 110 is fluidly connected to a conduit 112. The conduit 112 leads to a T-connection 114 at the front of the vehicle as shown in FIG. 1. A pair of branch conduits 116 are fluidly connected to the connections 58 of the vacuum motors 36. The base section 90 is connected to the bracket 82 by fasteners (not shown). The section 90 includes grooves 120 in which there are positioned insulated terminals 122, 123. The lower terminal 123 is connected by lead 124 to the motor 60 of the pump assembly 24. The upper terminal 122 is connected by a lead 126 to the vehicle battery 128 and ground 130.

The diaphragm 94 is centrally apertured. A pair of reinforcing plates 134 and 136 positioned on either side of the diaphragm 94 are fixedly connected to a slidable plunger 138 by a flattened rivet head section 140. The plunger 138 is slidably disposed in a central bore in the base section 90 and is fluidly sealed therein by an O-ring 142. The plunger 138 terminates with a projecting stem 146. A plurality of passages 150 are formed in the plates 134, 136 and the diaphragm 94. The passages 150 provide restricted orifices between the chambers 96, 108. The reinforcing plate 134 includes an elastomeric sealing ring 160. A vent 162 formed in section 88 registers with the ring 160. When the diaphragm 94 is shifted to the left the ring 160 seals the vent 162.

The button 86 includes a head section 170 projecting into the passenger compartment through an opening 172 in the instrument panel 84. The button 86 includes a rearwardly opening passage 174 into which the stem 146 partially projects. A helical compression spring 180 is operatively disposed in the passage 174 and serves to bias the frustoconical base 181 of the button 86 against the rear surface of the panel 84. An annular conductor ring 182 is carried on the rear surface of the button 86. The ring 182 is adapted to electrically connect terminals 122 when the button is depressed to thereby complete a circuit between the battery 128 and the pump 60 to energize the latter.

OPERATION OF THE WASHER AND WIPER SYSTEM

During operation of the vehicle, especially during winter months, salt and road grime can accumulate on the lenses of the headlamps thereby lowering the optical efficiency of the latter. The subject mechanism is adapted to remove this accumulation in a single cycle.

The cycle is operator initiated by depressing button 86. The button 86 is depressed until the ring 182 contacts the terminals 122, 123. This completes a circuit to the washer pump motor 60 thereby energizing the latter so as to pump solvent from the reservoir 22 through conduit 66 for programmed dispensing through conduits 68, 70 to the windshield wipers and through conduits 72, 74 to the holders 30 of the washer and wiper mechanisms 20. The latter will distribute solvent through the orifices 46 onto the lens 18.

Concurrently therewith, the depression of the button 86 compresses the spring 180 and shifts the plunger 138 leftwardly. The head section 140 contacts the head 103 of the valve 102 thereby opening the latter against the biasing of an internal spring and exposing chamber 96 to vacuum. The ring 160 seals the vent 162. The pressure differential between chambers 96, 108 maintains the shifted position against the biasing of the internal spring. Vacuum will be transmitted through passages 150 to chamber 108 and therefrom through outlet 110 and conduit 112 to the T-connection 114. From the T-connection vacuum is transmitted through branches 116 to the vacuum motors 36. The pressure differential there transmitted to the vacuum motors cause the pistons 54 to retract. This pivots the lever arms 32 downwardly about the pivot axes 52 and causes the holders 30 to traverse the lens 18 while solvent is concurrently being distributed thereon through the orifices 46. The pressure differential in the chambers 108 and 96 is gradually reduced during this period causing the diaphragm to move toward its centered position under the influence of the internal spring in valve 102. This closes valve 102 and opens vent 162 to atmosphere. The atmospheric bleeding through passage 150 and conduit 112 gradually reduces the applied vacuum at the motors 36 causing the piston 54 to extend under the influence of the internal spring to thereby move the holders 30 upwardly across the lenses 18 with the wiper blades removing the dissolved accumulations. A complete cycle is complete when the holder 30 reaches the upper parked position. For each subsequent energization, the vacuum motors are similarly energized to draw the holders 30 downwardly across the lenses 18 while spraying solvent thereon, the switch 26 thereafter reducing the applied vacuum such that the pistons extend to move the holders upwardly to the parked position.

The embodiments of the invention in which an exclusive property or privilege is claimed are defined as follows:

1. In a motor vehicle, a headlamp mounted on the vehicle and having a lens, a source of fluid pressure, a reservoir, pump means having inlet means and outlet means, said inlet means fluidly communicating with the reservoir, said pump means operative to draw solvent from the reservoir through said inlet means and dispense solvent through said outlet means, a wiper and washer holder supported on the vehicle adjacent the headlamp for pivotal movement between first and second positions at opposed locations with respect to the headlamp, a wiper blade on said holder adapted to wipe the surface of the lens during said movement, nozzle means on said holder fluidly connected to the outlet means of the pump means, fluid motor means operated by fluid pressure for moving the holder from said first position to said second position, spring means for returning said holder from said second position to said first position, and operator actuated switch means having an electrical switch portion for energizing the pump means for delivering solvent to said nozzle means for distribution on the lens as the wiper blade moves toward said second position, a fluid switch portion for connecting the fluid motor means with said source of fluid pressure to move the holder to the second position and actuating means for mechanically simultaneously actuating both said electrical switch portion and said fluid switch portion, whereby solvent is distributed on said lens from the nozzle means as the fluid motor means moves the holder to the second position and wiped therefrom by the blade as said spring means returns the holder to the first position.

2. A headlamp washing and wiping system for a motor vehicle having a headlamp mounted thereon with a lens subject to accumulations comprising: a source of fluid pressure, a reservoir; pump means having an inlet and an outlet, said inlet fluidly communicating with the reservoir, said pump means operative to draw solvent from the reservoir through said inlet and to dispense solvent through said outlet; a wiper and washer holder supported on the vehicle adjacent the headlamp for vertical pivotal movement with respect to the lens between an upper park position above the lens and a lower position adjacent the bottom of the lens; a wiper blade on said holder adapted to contact and wipe the surface of the lens during said movement; a nozzle on said holder; a conduit connecting the pump outlet with the nozzle to distribute solvent on the lens trailing the wiper blade; a fluid motor operatively connected to the holder, said motor when energized moving the holder between the upper park position and the lower position; spring means opposing movement of the holder; an operator actuated switch for (1) energizing the pump means to deliver solvent through said outlet and (2) for connecting the fluid motor with said source of fluid pressure, said switch means including a housing with a chamber, said chamber having a diaphragm therein dividing the latter into two portions, the first portion being connected to the source, the second portion being connected to the fluid motor; valve means actuated by movement of the diaphragm to connect the source with said first portion; orifice means in the diaphragm fluidly connecting the portions; vent means in said first portion opened and closed by the diaphragm, actuation of the switch moving the diaphragm to (1) open the valve means to connect the first portion with the fluid pressure and (2) close the vent means whereby the pressure in the latter is transmitted through the orifice means to the second portion and to the fluid motor for energizing the latter thereby moving the holder to the lower position, the diaphragm moving to the normal position as the pressure in the portions equalizes to open the vent means thereby deenergizing the fluid motor and disconnecting said fluid motor from said source at the other of said positions whereby solvent is distributed on said lens as the holder travels to the one position and wiped therefrom along with dissolved accumulations as the holder moves to the other position under the biasing of said outlet, 3. A headlamp washing and wiping system for a motor vehicle headlamp having a spherical lens subject to accumulations, comprising: a source of vacuum; a reservoir; a windshield washer pump, said pump having an inlet and an outler, said inlet fluidly communicating with the reservoir, said pump operative to draw solvent from the reservoir through said inlet and to dispense solvent through said outlet; a wiper and washer holder including a wiper blade supported on the vehicle adjacent the headlamp for vertical pivotal movement with respect to the lens in an arc having a radius substantially equal to the spherical radius of the lens such that the blade maintains contact with the lens throughout said movement, said holder moving between an upper park position above the lens and a lower position adjacent the bottom of the lens, said holder having a curvature in a horizontal plane substantially conforming to the shape of the lens such that the blade maintains contact with the lens during said movement of the holder; a plurality of nozzles on said holder; a conduit connecting the pump outlet with the nozzles to distribute solvent therethrough and onto the lens trailing the wiper blade in its downward movement; a vacuum motor operatively connected to the holder, said motor when energized moving the holder between the upper position and the lower position; a spring opposing movement of the motor and operative to return the holder to the upper position; an operator actuated switch, said switch including electrical contacts for energizing the pump to deliver solvent through said outlet, said switch including valve means for connecting the vacuum motor with said source of vacuum, said switch means having a housing with an internal chamber, said chamber having a diaphragm positioned therein dividing the chamber into two portions, the first portion being connected to the source, the second portion being connected to the vacuum motor; a valve in the switch opened by movement of the diaphragm to connect the source with the first portion; orifice means in the diaphragm fluidly connecting the portions; vent means in said first portion open and closed by the diaphragm, actuation of the switch (1) moving the diaphragm to close the contacts, (2) opening the valve to connect the first portion with vacuum and (3) closing the vent means, whereby the vacuum in the first portion is transmitted through the orifice means to the second chamber and to the motor for energizing the latter to initiate downward movement of the holder and to distribute solvent on said lens as the holder travels to the lower position, the diaphragm moving to the normal position as the pressure in the portions equalizes to open the vent means to thereby pressurize and deenergize the motor whereby the accumulations are wiped from the lens as the holder returns to the upper position.

* * * * *